US009688173B2

(12) United States Patent
Ulrich et al.

(10) Patent No.: US 9,688,173 B2
(45) Date of Patent: Jun. 27, 2017

(54) SUSPENSION SYSTEM FOR VEHICLES AND METHOD FOR FITTING VEHICLE PARTS WITH SUSPENSION

(71) Applicant: GRAMMER AG, Amberg (DE)

(72) Inventors: Stephan Ulrich, Hamburg (DE); Konstantin Krivenkov, Hamburg (DE); Rainer Bruns, Hamburg (DE); Erwin Haller, Birgland (DE); Jens Kolb, Konigstein (DE)

(73) Assignee: Grammer AG, Amberg (DE)

( * ) Notice: Subject to any disclaimer, the term of this patent is extended or adjusted under 35 U.S.C. 154(b) by 100 days.

(21) Appl. No.: 14/755,064

(22) Filed: Jun. 30, 2015

(65) Prior Publication Data

US 2016/0001685 A1    Jan. 7, 2016

(30) Foreign Application Priority Data

Jul. 1, 2014 (DE) .................. 10 2014 109 191

(51) Int. Cl.
*B60N 2/52* (2006.01)
*B60N 2/50* (2006.01)
*F16F 13/00* (2006.01)

(52) U.S. Cl.
CPC ............... *B60N 2/52* (2013.01); *B60N 2/501* (2013.01); *B60N 2/502* (2013.01); *B60N 2/505* (2013.01);

(Continued)

(58) Field of Classification Search
CPC ........ B60N 2/501; B60N 2/502; B60N 2/505; B60N 2/525; B60N 2/522; B60N 2/527;

(Continued)

(56) References Cited

U.S. PATENT DOCUMENTS 2,671,631 A    3/1954   Fox
2,854,065 A    9/1958   Fox (Continued)

FOREIGN PATENT DOCUMENTS

CA    2069451    11/1992
CA    2337695     8/2001

(Continued)

OTHER PUBLICATIONS

Official Action for China Patent Application No. 201310683558.X, dated Oct. 11, 2016.

(Continued)

*Primary Examiner* — Bradley Duckworth
(74) *Attorney, Agent, or Firm* — Sheridan Ross, PC

(57) ABSTRACT

Suspension system for vehicle seats, in particular for utility motor vehicle seats, comprising at least a first and a second part, the two parts being mounted oscillatorily movable and spring-loaded with respect to one another, wherein a closed hydropneumatic circuit is provided which comprises at least one control element, connected to at least one of the two parts, and at least one first hydropneumatic spring connected in series therewith, a hydraulic pressure of a hydraulic medium in the circuit being convertible into a force acting between the two parts by means of an action surface arranged in the control element, the pressure being dependent on a gas pressure in a gas volume of the first spring.

16 Claims, 2 Drawing Sheets

(52) U.S. Cl.
CPC ............. *B60N 2/508* (2013.01); *B60N 2/525* (2013.01); *B60N 2/527* (2013.01); *F16F 13/002* (2013.01)

(58) Field of Classification Search
CPC .... B60N 2/52; B60N 2/1665; B62D 33/0608; F16F 15/027
See application file for complete search history.

(56) References Cited

U.S. PATENT DOCUMENTS

| | | | |
|---|---|---|---|
| 3,338,622 A | 8/1967 | Bachmann | |
| 3,572,817 A | 3/1971 | Colautti et al. | |
| 3,622,202 A | 11/1971 | Brown | |
| 3,659,895 A | 5/1972 | Dresden | |
| 3,860,283 A | 1/1975 | Colautti | |
| 4,097,016 A | 6/1978 | Petrucci | |
| 4,169,625 A | 10/1979 | Petersen | |
| 4,316,631 A | 2/1982 | Lenz et al. | |
| 4,330,160 A | 5/1982 | Stolz et al. | |
| 4,344,597 A | 8/1982 | Eimen | |
| 4,401,287 A | 8/1983 | Moeser | |
| 4,477,050 A | 10/1984 | Thompson et al. | |
| 4,570,997 A | 2/1986 | Tanizaki et al. | |
| 4,588,314 A | 5/1986 | Anscher | |
| 4,722,617 A | 2/1988 | Stella et al. | |
| 4,792,188 A | 12/1988 | Kawashima | |
| 4,834,452 A | 5/1989 | Goodrich | |
| 4,971,392 A | 11/1990 | Young | |
| 5,039,164 A | 8/1991 | Gibbs | |
| 5,042,864 A | 8/1991 | Mochizuki | |
| 5,161,765 A | 11/1992 | Wilson | |
| 5,292,179 A | 3/1994 | Forget | |
| 5,395,157 A | 3/1995 | Rollo et al. | |
| 5,437,494 A | 8/1995 | Beauvais | |
| 5,518,294 A | 5/1996 | Ligon et al. | |
| 5,568,960 A | 10/1996 | Oleson et al. | |
| 5,580,129 A | 12/1996 | Findlay | |
| 5,690,385 A | 11/1997 | Feldman et al. | |
| 5,704,729 A | 1/1998 | Carnahan et al. | |
| 5,720,462 A | 2/1998 | Brodersen | |
| 5,779,309 A | 7/1998 | Lu | |
| 5,810,441 A | 9/1998 | Ezuka et al. | |
| 5,853,221 A | 12/1998 | Thoman et al. | |
| 5,882,076 A | 3/1999 | Garelick et al. | |
| 5,890,764 A | 4/1999 | Lee | |
| 5,906,441 A | 5/1999 | Seki | |
| 5,941,498 A | 8/1999 | Hoshihara et al. | |
| 5,975,508 A * | 11/1999 | Beard | B60N 2/501 180/89.12 |
| 6,021,989 A | 2/2000 | Morita et al. | |
| 6,079,786 A | 6/2000 | Kirkland et al. | |
| 6,158,300 A | 12/2000 | Klingler | |
| 6,164,722 A | 12/2000 | Mabey | |
| 6,264,163 B1 | 7/2001 | Ivarsson | |
| 6,325,456 B1 | 12/2001 | Carnahan | |
| 6,402,114 B1 | 6/2002 | Carnahan et al. | |
| 6,447,065 B1 | 9/2002 | Ropp | |
| 6,557,919 B2 | 5/2003 | Suga et al. | |
| 6,575,420 B2 | 6/2003 | Yoshida et al. | |
| 6,722,737 B2 | 4/2004 | Kanai | |
| 6,877,811 B1 | 4/2005 | Garelick | |
| 7,036,883 B1 | 5/2006 | Thompson et al. | |
| 7,108,325 B2 | 9/2006 | Williamson et al. | |
| 7,121,608 B2 | 10/2006 | Billger et al. | |
| 7,140,685 B2 | 11/2006 | Gardner | |
| 7,328,952 B2 | 2/2008 | Guerrini | |
| 7,506,932 B2 | 3/2009 | Bostrom et al. | |
| 7,520,567 B2 | 4/2009 | Billger et al. | |
| 7,575,206 B2 | 8/2009 | Meier | |
| 7,600,732 B2 | 10/2009 | Kennedy | |
| 7,845,703 B2 | 12/2010 | Panzarella et al. | |
| 7,950,740 B2 | 5/2011 | Bunea et al. | |
| 7,997,600 B2 * | 8/2011 | Haller | B60G 17/0155 280/124.157 |
| 8,033,589 B2 | 10/2011 | Kusanagi et al. | |
| 8,182,038 B2 * | 5/2012 | Haller | B60N 2/501 248/550 |
| 8,197,004 B2 * | 6/2012 | Wahls | B60N 2/502 297/344.1 |
| 8,256,842 B2 * | 9/2012 | Himmelhuber | B60N 2/002 297/344.12 |
| 8,265,832 B2 * | 9/2012 | Haller | B60N 2/501 180/89.13 |
| 8,342,541 B2 * | 1/2013 | Wurmthaler | B60N 2/501 248/636 |
| 8,485,600 B2 | 7/2013 | Forsman et al. | |
| 8,602,495 B2 | 12/2013 | Jeong et al. | |
| 8,682,528 B2 * | 3/2014 | Contratto | B60N 2/501 340/667 |
| 8,684,461 B2 * | 4/2014 | Haller | B60N 2/06 297/302.2 |
| 8,757,600 B2 * | 6/2014 | Haller | B60N 2/501 248/566 |
| 8,783,772 B2 | 7/2014 | Schuler et al. | |
| 8,840,172 B2 * | 9/2014 | Haller | B60G 17/0155 296/190.07 |
| 8,864,145 B2 * | 10/2014 | Haller | B60N 2/501 280/124.157 |
| 9,073,463 B2 | 7/2015 | Kuriyama | |
| 9,085,245 B2 | 7/2015 | Haller | |
| 9,115,781 B2 * | 8/2015 | Kolb | B60G 17/0416 |
| 9,120,409 B2 * | 9/2015 | Haller | B60N 2/06 |
| 9,139,111 B2 | 9/2015 | Ott | |
| 9,180,792 B2 | 11/2015 | Haller | |
| 9,211,812 B2 | 12/2015 | Haller | |
| 9,227,529 B2 | 1/2016 | Haller | |
| 9,248,768 B2 * | 2/2016 | Kolb | B60N 2/52 |
| 9,296,321 B2 * | 3/2016 | Haller | B60N 2/502 |
| 9,371,882 B2 * | 6/2016 | Haller | F16F 9/185 |
| 9,377,074 B2 * | 6/2016 | Lorey | F16F 9/0218 |
| 2002/0130528 A1 | 9/2002 | Mans | |
| 2002/0149250 A1 | 10/2002 | Silvia | |
| 2002/0190560 A1 | 12/2002 | Kohl et al. | |
| 2003/0189370 A1 | 10/2003 | Hemmer et al. | |
| 2004/0066074 A1 | 4/2004 | Ovitt | |
| 2004/0112659 A1 * | 6/2004 | Kramer | B60G 17/015 180/89.12 |
| 2004/0188582 A1 | 9/2004 | Flynn et al. | |
| 2004/0212242 A1 | 10/2004 | Gryp et al. | |
| 2004/0232399 A1 | 11/2004 | Stone | |
| 2006/0226685 A1 | 10/2006 | Priepke et al. | |
| 2007/0196038 A1 | 8/2007 | Haepp | |
| 2008/0031560 A1 | 2/2008 | Fukuda | |
| 2008/0211284 A1 | 9/2008 | Mutou et al. | |
| 2009/0102271 A1 | 4/2009 | Squires et al. | |
| 2009/0179390 A1 * | 7/2009 | Wurmthaler | B60N 2/501 280/5.519 |
| 2009/0284061 A1 | 11/2009 | Maier et al. | |
| 2010/0001169 A1 | 1/2010 | Armo et al. | |
| 2010/0117413 A1 | 5/2010 | Squires | |
| 2010/0117428 A1 | 5/2010 | Deml et al. | |
| 2010/0219009 A1 | 9/2010 | Turco et al. | |
| 2010/0244420 A1 | 9/2010 | Scarf | |
| 2011/0074198 A1 | 3/2011 | Iwasaki et al. | |
| 2011/0163586 A1 | 7/2011 | Findlay | |
| 2012/0237151 A1 | 9/2012 | Felis | |
| 2012/0305347 A1 | 12/2012 | Mori et al. | |
| 2013/0193729 A1 | 8/2013 | VanMiddendorp et al. | |
| 2014/0167469 A1 | 6/2014 | Haller | |
| 2014/0167470 A1 | 6/2014 | Lorey | |
| 2015/0015039 A1 | 1/2015 | Brand et al. | |
| 2015/0035334 A1 | 2/2015 | Roth et al. | |
| 2015/0158404 A1 * | 6/2015 | Pylypenko | B60N 2/525 248/575 |
| 2016/0039315 A1 | 2/2016 | Haller et al. | |
| 2016/0200230 A1 * | 7/2016 | Haller | B60N 2/501 296/190.08 |
| 2016/0207430 A1 * | 7/2016 | Haller | B60N 2/501 |
| 2016/0214658 A1 * | 7/2016 | Haller | B60N 2/501 |

(56) References Cited

U.S. PATENT DOCUMENTS

2016/0230830 A1* 8/2016 Haller .................. B60N 2/505
2016/0311446 A1* 10/2016 Haller .................. B60N 2/505

FOREIGN PATENT DOCUMENTS

| | | |
|---|---|---|
| CN | 202480912 | 10/2012 |
| CN | 103863146 | 6/2014 |
| DE | 1116987 | 11/1961 |
| DE | 1480465 | 1/1970 |
| DE | 2828503 | 1/1980 |
| DE | 3127625 | 6/1982 |
| DE | 3218379 | 11/1983 |
| DE | 3708399 | 9/1987 |
| DE | 4415933 | 11/1994 |
| DE | 69202551 | 2/1996 |
| DE | 69721383 | 3/2004 |
| DE | 60118068 | 8/2006 |
| DE | 202006010184 | 9/2006 |
| DE | 10 2006 037 068 A1 | 2/2008 |
| DE | 102007021141 | 9/2008 |
| DE | 102008058409 | 7/2009 |
| DE | 102010017328 | 12/2011 |
| DE | 102010053752 | 6/2012 |
| DE | 102011009543 | 8/2012 |
| DE | 102012112525 | 6/2014 |
| EP | 0515275 | 11/1992 |
| EP | 0921962 | 6/1999 |
| EP | 1659021 | 5/2006 |
| EP | 1824358 | 8/2007 |
| EP | 1924462 | 5/2008 |
| EP | 2213504 | 8/2010 |
| EP | 2293959 | 3/2011 |
| FR | 2201659 | 4/1974 |
| GB | 525663 | 9/1940 |
| GB | 2277494 | 11/1994 |
| JP | H06-316233 | 11/1994 |
| JP | H10-217811 | 8/1998 |
| JP | H11-198692 | 7/1999 |
| JP | 2002-211284 | 7/2002 |
| JP | 2002-306267 | 10/2002 |
| JP | 2003-063288 | 3/2003 |
| JP | 2004-203160 | 7/2004 |
| KR | 10-2013-0056092 | 5/2013 |
| WO | WO 2004/056605 | 7/2004 |
| WO | WO 2007/028473 | 3/2007 |
| WO | WO 2010/114966 | 10/2010 |

OTHER PUBLICATIONS

Search Report prepared by the German Patent Office for German Application No. 10 2014 109 191.4, dated Feb. 24, 2015.
Notice of Allowance for U.S. Appl. No. 14/203,427, mailed Nov. 21, 2016, 2 pages.
Advisory Action for U.S. Appl. No, 14/109,117, mailed Aug. 23, 2016, 3 pages.
Notice of Allowance for U.S. Appl. No. 14/109,117, mailed Dec. 13, 2016, 10 pages.
Notice of Allowance for U.S. Appl. No. 14/109,117, mailed Jan. 26, 2017, 3 pages.
Official Action for U.S. Appl. No. 14/726,798 mailed Dec. 14, 2016, 10 pages.

* cited by examiner

SUSPENSION SYSTEM FOR VEHICLES AND METHOD FOR FITTING VEHICLE PARTS WITH SUSPENSION

CROSS-REFERENCE TO RELATED APPLICATIONS

This application claims the benefit of German Application No. 10 2014 109 191.4, filed Jul. 1, 2014, the contents of which are incorporated herein by reference.

BACKGROUND

Agricultural and construction machines often have to travel over very uneven terrain. In these cases, the driver is exposed to strong oscillations and impacts, which act on the driver via the bodywork and the seat. To reduce the vibrational load on the driver, the seats are generally equipped with passive suspension systems. Typically, pneumatic springs and hydraulic dampers are used for this purpose, and, together with a guide, connect the seat to the bodywork and reduce the transmission of vertical accelerations. However, these passive suspension systems rapidly reach the physical limit thereof, in particular for low-frequency oscillations. In this frequency range, the transmission of the disruptions is barely reduced and in some cases even increased.

In these conditions, a major improvement to the driver's comfort can only be achieved using an active suspension system. In active systems, various control elements are generally used instead of the passive elements such as springs and dampers. In known active suspension systems for agricultural and construction machines, hydraulic or electrical control elements are used to reduce the disruptive vertical accelerations on the driver from the vehicle by intervening in the movement of the seat.

The known hydraulic control elements consist of conventional double-action cylinders having a connected control unit for metering the hydraulic power required during the travel. The total power required for operating the active system is composed of the static component for supporting the driver and the dynamic component for actively reducing the transmissiveness of the suspension system. Because of the very high energy requirement, the necessary hydraulic power is provided outside the suspension system. The hydraulic control elements therefore always have to be connected to the adapted hydraulic on-board power system of the vehicle. The use of systems of this type in vehicles not equipped in this manner is thus greatly limited or impeded. In addition, this requires the use of the corresponding high-pressure lines having relatively narrow cross sections inside and outside the control element, which cause a strong development of noise because of the continuous flow of the hydraulic fluid through the system.

In most cases, the known electrical control elements consist of a conventional linear drive or of a conventional electric motor having a downstream transmission. The linear drives may be placed in the seat guide or between the seat base and the seat surface. The motor/transmission combinations are installed in the middle of the scissor mechanism often used as the seat guide. By comparison with hydraulic control elements, electrical control elements are much more energy-efficient because of the much higher efficiency. In the installation situation being described in the suspension system, the required total electrical power thereof is about half of the hydraulic power.

However, in control elements of motor/transmission combinations, the required total electrical power is somewhat higher because of the reduction in efficiency caused by the use of a strongly reducing transmission. In addition, the required electrical power is highly dependent on the vertical position of the seat.

In all known electrical control elements, relatively high electric currents occur in active operation, and have to be provided or discharged accordingly during rapid acceleration or braking of the load on the seat surface. To achieve a significant improvement in the oscillation insulation of the driver in active operation by comparison with passive operation, the electrical circuits of the control element thus have to be highly oversized. In addition, circuits of this type require sufficient ventilation of the suspension system so as to be able to keep the control elements at an acceptable operating temperature during the described rapid load change processes.

A further drawback of the above-described hydraulic and electrical active suspension systems is the lack of robustness if the supply of hydraulic or electrical power required for operation is interrupted or switched off. Without passive elements connected in parallel, these systems have no oscillation-reducing effect when switched off, and thus have no failsafe functionality. This can put the driver's safety at risk.

Therefore, in some known active systems, the electrical control elements are installed in the suspension system in parallel with the passive elements. This does provide failsafe functionality of the system, but in active operation the control elements have to apply an additional power component to overcome the forces of the passive elements.

SUMMARY

The present disclosure provides a suspension system for vehicle seats, in particular for utility motor vehicle seats, which has the effectiveness of hydraulic or electrical systems whilst being much more energy-efficient and less susceptible to faults.

More particularly, the present disclosure provides a suspension system for vehicle seats, in particular for utility motor vehicle seats, comprising at least a first and a second part, the two parts being mounted oscillatorily movable and spring-loaded with respect to one another, a closed hydropneumatic circuit being provided which comprises at least one control element, connected to at least one of the two parts, and at least one first hydropneumatic spring connected in series therewith, a hydraulic pressure of a hydraulic medium in the circuit being convertible into a force acting between the two parts by means of an action surface arranged in the control element, the pressure being dependent on a gas pressure in a gas volume of the first spring.

Hydropneumatic suspension systems perform damping and suspension functions by means of a combination of hydraulics and pneumatics. Hydropneumatic springs therefore have a volume portion for a gas and a volume portion for a hydraulic medium, both media being separated from one another for example by a membrane. The gas forms the actual suspension element.

In turn, the control element preferably consists of an outer cylinder having an internal piston comprising a piston rod and a piston plate. The piston plate has an end face, which preferably forms the action surface. The hydraulic medium is arranged on one side of the piston plate; the piston plate or the action surface thus forms the boundary for the hydraulic medium. The hydraulic medium is preferably arranged on the side of the piston plate opposite the side on which the piston rod is arranged. However, it may also be arranged on the same side as the piston rod. In this case, the action surface of the piston plate is theoretically reduced by the amount taken up by the end face of the piston rod by which it is connected to the piston plate.

From the field of vibration mechanics, various types of excitation of an oscillation system are known. A linear damped oscillation system, such as a mass-spring-damper system, is for example characterized in that a spring and a damper are connected in parallel between a mass on one side and a suspension device on the other side. For example, a periodic force which acts on the mass can excite it to oscillations of a constant initial amplitude (force excitation). Another possibility for exciting the mass to oscillations is by means of a time-dependent movement of the suspension device (displacement excitation). This second type of excitation is also known as base point excitation, and plays a major role in vehicle oscillation technology. In particular, it is conceivable for the mass to be the vehicle seat and for the suspension device to be the vehicle floor. If the vehicle now travels over uneven terrain, the seat is excited to vibrations/oscillations by way of the change in position of the vehicle floor. Subsequently, forces are generated in the same direction as or counter to the oscillation excitations by means of suitable spring/damper devices of the suspension system, said forces being intended to reduce the vibrational load on the driver. The forces, also known as restoring forces, are thus the reaction of the suspension system to incoming oscillation excitations, which may be detected for example in the form of acceleration signals or the occurring deflection.

It is therefore advantageous for the action surface arranged in the control element to be arranged facing the hydraulic medium and to be movable in two opposing movement directions by means of oscillatory movements of the two parts with respect to one another, it being possible to increase the pressure by means of a movement of the action surface in the direction towards the hydraulic medium.

Before the suspension system is set in operation, the circuit is biased to a particular pressure by filling it with a hydraulic fluid, for example oil. As described above, the hydropneumatic spring has a particular gas pressure, which corresponds to a bias of the first spring, in the gas volume thereof. The lower this gas pressure, and thus the bias of the hydropneumatic spring, the more fluid can be filled into the circuit in total.

The compression is a squeezing of a body from all sides, reducing the volume thereof and increasing the density thereof. Bodies are only described as compressible if the occurring pressure changes are sufficient to cause noticeable changes in density, and this usually only applies to gases. As is generally known, the compressibility of liquids is basically negligible. These properties are exploited in the present suspension system.

Incoming oscillation excitations thus lead to the upper part moving towards and/or back away from the lower part. This results in accelerations or relative speeds of the upper part with respect to the lower part, which can be measured. At the same time, the action surface of the control element is displaced in one of the movement directions thereof, a total of two movement directions, preferably arranged counter to one another, generally being possible. The action surface of the control element is advantageously arranged facing the hydraulic medium. Displacing the action surface towards the volume of the hydraulic medium results in a decrease in the volume of the hydraulic medium in the control element. The hydraulic medium passes into the rest of the circuit, increasing the pressure in the circuit because the circuit is closed. Analogously, displacing the action surface away from the volume of the hydraulic medium leads to an increase in the volume of the hydraulic medium in the control element, increasing the total volume available in the circuit for the hydraulic medium. The pressure in the circuit thus decreases.

The action surface provided in the control element initially converts the pressure in the circuit into a force acting on the control element. This force can be converted by the arrangement of the control element into a force acting between the two parts. Advantageous positions and connection points of the control element are illustrated in FIGS. 2a to 2c. By way of the highly variable positioning of the control element and the connection points thereof, the desired conversion of the force of the control element or the force acting between the two parts into the force acting on the seat surface can be achieved. This conversion may be constant, progressive or degressive.

It is thus advantageous for the movement direction of the control element to be arranged parallel, perpendicular and/or at an angle to the direction of the oscillatory movements of the two parts.

If the seat surface is deflected for example downwards or upwards from the rest position (for example by a base point excitation), this movement is converted into a movement of the control element or the components thereof in accordance with the selected position or arrangement of the control element, causing the change in volume and ultimately the change in pressure to be achieved. Subsequently, the change in pressure can in turn be converted by way of the action surface provided in the control element into a force acting between the two parts, which may be considered a reaction to the oscillatory excitation.

The change in the pressure in the system is only dependent on the ratio of the change in the volume available to the hydraulic medium in the cylinder to the change in the volume available to the gaseous medium in the gas volume of the hydropneumatic spring. The greater the change in volume of the gaseous medium, the smaller this ratio. The smaller this ratio, the smaller the rise in pressure in the system. The change in volume of the gaseous medium is in turn directly dependent on the initial pressure or bias thereof.

Thus, the pressure in the hydraulic medium is directly dependent on the pressure in the gaseous medium. Assigned for the values in the suspension system, it thus holds that the spring characteristic of the suspension system is directly dependent on the initial bias of the first hydropneumatic spring. A high bias results in a correspondingly flat or soft spring characteristic; by contrast, a low bias leads to a steep or hard spring characteristic. The characteristic of the suspension system can thus be set in a simple manner.

In accordance with a preferred embodiment, it is advantageous for the circuit further to comprise an adjustable volume flow regulation component, arranged downstream from the control element and upstream from the first spring in the flow direction of said circuit, for regulating the value of the volume flow of the hydraulic medium of the circuit, and/or a hydraulic pump arranged downstream from the spring and upstream from the control element in the flow direction.

Since all the aforementioned elements of the circuit, namely the control element, the volume flow regulation component, the first spring and the pump, are connected in series, the volume of the hydraulic medium displaced in the control element can only reach the first spring by way of the volume flow regulation component, irrespective of whether the pump is switched on or off. The elements of the circuit can be connected by rigid and/or flexible lines. By means of the volume flow regulation component, it is now possible for example to change the cross section of the line, in such a way that the volume flow can accordingly also be changed. This may also be referred to as a change in the hydraulic resistance. A reduced cross section reduces the volume flow; the hydraulic resistance is therefore high. Analogously, an increased cross section increases the volume flow; the hydraulic resistance is therefore low. A constant cross section or constant hydraulic resistance accordingly has no effect on the volume flow.

It has been found to be advantageous for the volume flow regulation component to be adjustable dependent on acceleration and/or speed values calculable from the oscillatory movements of the two parts with respect to one another. These acceleration values may for example be detected using acceleration sensors, which are well known in the art. The speed values may be determined for example by determining the deflection, in other words the degree of compression of springs arranged between the two parts.

It is further advantageous for the pressure to be changeable by way of a level regulation device arranged in the circuit, the level regulation device comprising a first throttle valve, arranged between the control element and the pump, and a second hydropneumatic spring connected in series therewith, a non-return valve connected in series and a second throttle valve connected in parallel with the non-return valve being arranged between the first throttle valve and the second spring.

A level regulation device is suitable for setting the distance between the two movable parts dependent on the driver's weight, in such a way that there is enough remaining spring deflection available for optimal suspension for every different driver.

In the present circuit, the above-described level regulation device can reduce or increase the pressure in the circuit. If for example a lower seat position is to be assumed, the amount of fluid in the circuit has to be reduced. However, since the circuit is closed, the volume flow of the hydraulic medium is divided by means of the level regulation device. For this purpose, the first throttle valve is actuated while the pump is switched on. Part of the hydraulic fluid from the circuit is conveyed into the second spring via the non-return valve. Analogously to the first hydropneumatic spring, this second hydropneumatic spring likewise has a gas volume portion and a liquid volume portion. As a result in the increase in the liquid volume portion, the pressure in the gas volume rises and the pressure in the circuit falls. By contrast, if a higher seat position is to be assumed, the amount of liquid and thus the pressure in the circuit should accordingly be increased. For this purpose, the second throttle valve is actuated. The gas in the gas volume portion of the second spring can decompress, causing the hydraulic medium from the second spring to be conveyed back into the circuit.

Advantageously, the volume flow regulation component may be formed by at least one servo-hydraulic, proportional, electrorheological and/or magnetorheological valve.

It is further been found to be advantageous for the control element to be formed by a single-action or dual-action hydraulic cylinder, membrane actuator and/or bellows actuator.

In practice, it has additionally been found to be expedient for a gaseous medium of the first spring and/or the second spring to be nitrogen and/or for the hydraulic medium of the circuit to be oil.

By way of the described suspension system, various suspension methods are now possible. The object of the invention is thus also achieved by a method for hydropneumatic suspending of parts of a vehicle seat comprising a first and a second part with, the two parts oscillatorily moving with respect to one another and being mounted hydropneumatically spring-loaded, an action surface arranged in a control element being moved in a movement direction, by means of oscillatory movements of the two parts with respect to one another, in a closed hydropneumatic circuit which comprises at least one control element, connected to at least one of the two parts, at least one first hydropneumatic spring, arranged in series therewith, and an adjustable volume flow regulation component, arranged downstream from the control element and upstream from the spring in the flow direction, for regulating a value of the volume flow of a hydraulic medium of the circuit, changing a hydraulic pressure in the circuit, which pressure is converted by means of the action surface arranged in the control element into a force acting between the two parts, the pressure additionally being determined by a gas pressure in a gas volume of the first spring.

It has thus been found to be advantageous for the volume flow of the hydraulic medium of the circuit to be driven by means of a hydraulic pump, arranged downstream from the spring and upstream from the control element in the flow direction of the circuit, in the on state of the pump.

Various properties of the described suspension system can now be set by means of the described elements and arrangements.

Thus, passive suspension may be provided if the volume flow of the medium is kept constant by means of the volume flow regulation component in an off state of the pump. The function of the control element corresponds to the function of a conventional viscous damper. In this case, the energy supplied to the control element during the movement of the seat surface is converted into heat. The closed circuit thus forms a passive hydropneumatic suspension system.

Semi-active suspension is provided if the volume flow of the medium is adjusted by means of the volume flow regulation component dependent on acceleration and/or speed values, calculable from the oscillatory movements of the two parts with respect to one another, in the off state of the pump. The closed circuit thus forms a semi-active hydropneumatic suspension system.

If fully active suspension is to be provided, the volume flow of the medium is advantageously adjusted by means of the volume flow regulation component dependent on acceleration and/or speed values, calculable from the oscillatory movements of the two parts with respect to one another, in the on state of the pump. The dynamic component of the load on the seat surface is absorbed by adjusting the volume flow regulation component or the hydraulic resistance. For dynamic control of the movement of the seat surface dependent on the oscillatory load, the hydraulic resistance is adjusted and the pressure in the control element is actively increased or decreased. The closed circuit thus forms a fully-active hydropneumatic suspension system. A major increase in the comfort of travel on uneven terrain is thus possible by comparison with passive or semi-active systems.

Finally, it is possible to adjust the seat height if the volume flow of the medium is adjusted to a minimum value by means of the volume flow regulation component in the on-state of the pump. To make the system as energy-efficient as possible, it is advantageous for the above-described level regulation device to take over the static adaptation of the position of the seat surface to the needs of the driver.

By way of the described device and the described method, because of the closed hydropneumatic circuit, among other things, it is further possible to reduce considerably the power and energy requirement and the development of noise. The static load is supported by the pressure level in the hydraulic system. Only the dynamic load has to be actively compensated.

The failsafe function is possible because when the power conditioning is switched off the hydraulic components arranged in series automatically change over to passive operation.

The module for the power supply can be arranged compactly inside the seat kinematics or inside the seat.

Further, as a result of the described variable arrangement of the control element, the conversion of the force of the control element into the resulting force between the two parts can be selected freely in advance.

Moreover, by way of the level regulation device, an independent level regulation and an automatic adaptation of the seat height to the driver's weight can be provided both in active and in passive operation.

The construction of the system is further configured flexibly, since both conventional and unconventional components can be used. For the spring function or for providing the hydraulic capacity, devices such as gas stores or other energy-storing elements may be used, such as hydraulic pistons comprising springs, resilient tubes, membranes or similar devices. Further advantages, aims and properties of the present invention are illustrated by way of the accompanying drawings and the following description, which show and describe a suspension system according to the invention by way of example.

DETAILED DESCRIPTION

Figure 1:
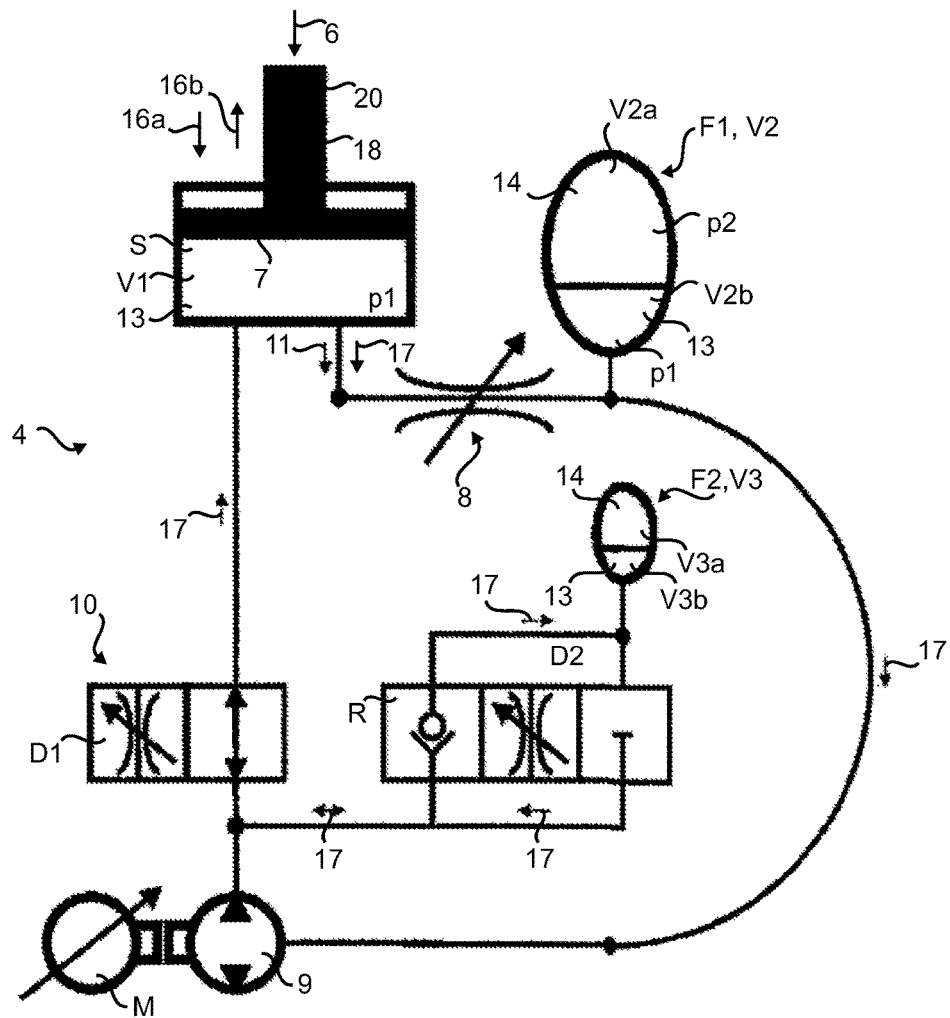
FIG. 1 schematically shows a preferred embodiment of the hydropneumatic circuit according to the invention.

FIG. 1 shows an embodiment of the hydropneumatic circuit 4 of the suspension system 1 according to the invention. The control element S, which according to the invention is connected to at least one of the two parts 2, 3 (not shown here) which are movable oscillatorily and mounted spring-loaded with respect to one another, is according to the invention connected in series with a hydropneumatic spring F1. The circuit 4 is filled with a hydraulic medium 13, which has the shown flow direction 11 of the volume flow 17 thereof. The proportion of the hydraulic medium 13 in the control element S takes on the volume V1. According to the variant shown, the control element S has two connections for the volume flow 17 of the hydraulic medium 13. However, instead what is known as a T-piece may be arranged on the control element S. This T-piece is generally a piece of tube or line and is of a shape similar to the letter "T". It is a component frequently used in gas and liquid lines, and makes it possible to provide a branch to an existing connection, for example by connecting a first portion of the T-piece to the control element S and the other two portions to the circuit 4, in such a way that the hydraulic medium 13 can flow through the T-piece. In this way, a connection at the control element S can be dispensed with.

The spring F1 has a total volume V2, which is subdivided into a volume portion V2a for the gaseous medium and a volume portion V2b for the hydraulic medium 13. There is a gas pressure p2 in the volume portion V2a for the gaseous medium 14, which is preferably nitrogen. The system pressure p1 applies in the volume portion V2b.

In this example, the control element S is formed as a conventional, single-action hydraulic cylinder S having a piston 18 and a movement direction 16. The shown cylinder S has an action surface 7, which is advantageously arranged perpendicular to the movement direction 16a, 16b. It is arranged facing the hydraulic medium 13. In this case, the movement direction 16a, 16b of the control element S denotes the movement direction of the piston 18, comprising a piston rod 20, arranged in the cylinder S. As is known in the art, the volume V1 is generally located below the action surface 7 of the piston 18, in other words on the side facing away from the piston rod 20. In the circuit 4, in particular in the hydraulic medium 13, there is a pressure p1. This pressure p1 is dependent on the amount of the hydraulic medium with which the circuit 4 was filled before the suspension system 1 was set in operation.

An oscillatory excitation acting on the control element S, in the form of an acceleration or movement resulting from oscillatory movements 12 occurring between the two parts 2, 3, now brings about a movement of the piston 18 in the movement direction 16a, 16b. In this example, the acceleration or movement acts downwards, causing the piston 18 also to be displaced downwards together with the action surface 7. This leads to the hydraulic medium 13 located below the piston 18 being displaced and the volume V1 being reduced. The oscillatory excitation is thus converted into a change in the pressure p1 by way of the action surface 7.

The pressure p1 is now dependent, among other things, on the pressure p2 in the gas volume aV2a. In particular, the change in the pressure p1 is dependent on the change in the pressure p2.

The circuit 4 shown further comprises a volume flow regulation component 8, arranged downstream from the control element S and upstream from the spring F1 in the flow direction 11 of said circuit, for regulating the value of the volume flow 12 of the hydraulic medium 13 of the circuit 4, and a hydraulic pump 9, arranged downstream from the spring F1 and upstream from the control element S in the flow direction 11. This pump can be driven by means of a motor M, in particular an electric motor, in such a way that it is possible to distinguish between an on-state 9a and an off-state 9b of the pump 9. The pump 9 only drives the volume flow 12 of the hydraulic medium 13 in the circuit 4 in the on-state 9a. The volume flow regulation component 8 is preferably formed by at least one servo-hydraulic, proportional, electrorheological and/or magnetorheological valve.

The circuit 4 further exhibits a level regulation device 10, by means of which the pressure p1 can be changed. For this purpose, a first throttle valve D1 arranged between the control element S and the pump 9 and a second hydropneumatic spring F2 connected in series therewith are provided. Further, a non-return valve R connected in series and a second throttle valve D2 connected in parallel with the non-return valve R are arranged between the first throttle valve D1 and the second spring F2. Analogously to the first hydropneumatic spring F1, the second spring F2 has a volume portion V3a for the gaseous medium 14 and a volume portion V3b for the hydraulic medium 13. By way of the level regulation device 10, an above-described volume flow division and thus a change in the system pressure p1 are possible.

Figure 2A:
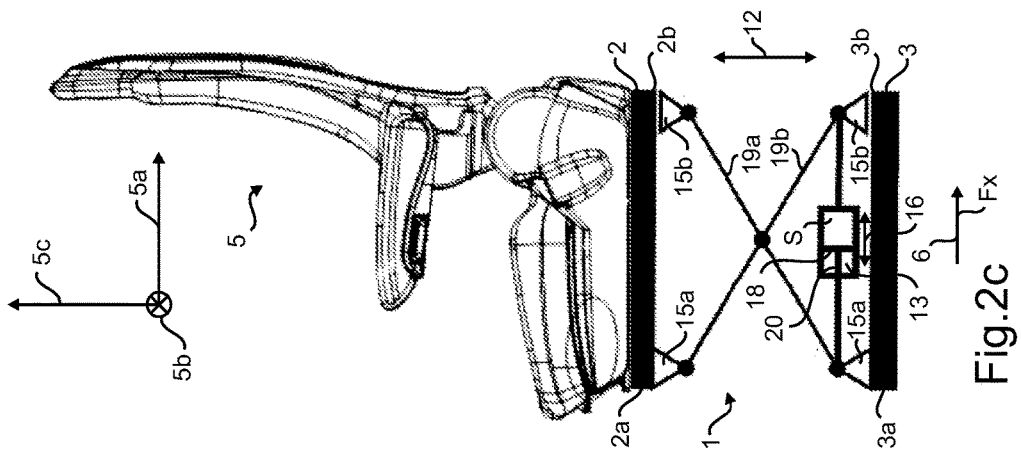
FIGS. 2a-c schematically show various embodiments in terms of the position of the movement direction of the control element in relation to the oscillation direction.
Figure 2B:
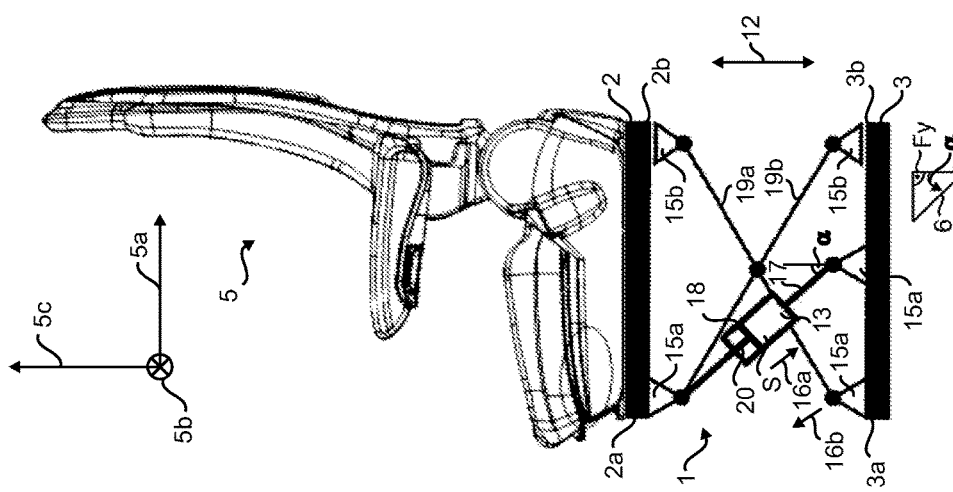
Figure 2C:
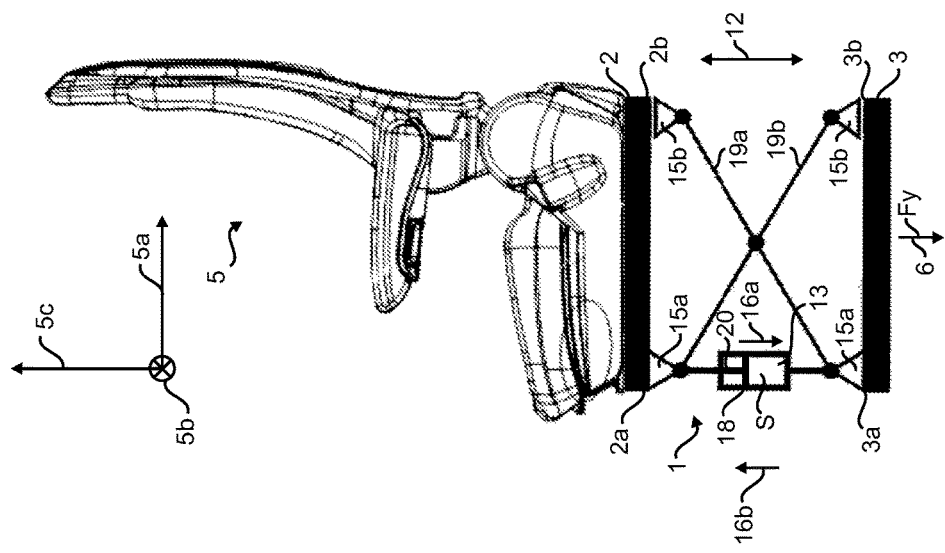

FIGS. 2a, 2b and 2c show various positions of the control element S dependent on the oscillation direction 12 of the two parts 2, 3. The remaining components of the circuit 4 are not shown.

For this purpose, a vehicle seat 5 is advantageously rigidly connected to a first part 2, which is mounted oscillatorily movable and spring-loaded with respect to a further part 3, for example the vehicle floor, by way of the arrangement shown. The arrangement shown advantageously comprises a solid bearing 15a in each case at the front ends 2a, 3a of the two parts 2, 3 and a floating bearing 15b in each case at the rear ends 2, 3 of the two parts 2b, 3b, in such a way that the shown scissor arms 19a, 19b can be moved towards one another in the longitudinal direction 5a of the vehicle seat 5 because of the degree of freedom at the floating bearings 15b, and oscillation of the two parts 2, 3 is possible in the oscillation direction 21. In this case, a vertical oscillation direction 21 is shown; however, oscillation directions 21 which are horizontal or extend obliquely with respect thereto are also conceivable.

The movement direction 16a, 16b of the control element S or the piston 18 arranged in the control element S can now be arranged parallel, perpendicular and/or at an angle to the direction of the oscillatory movement 12 of the two parts 2, 3.

FIG. 2a shows an arrangement of the movement direction 16a, 16b of the control element S parallel to the direction 21 of the oscillatory movement 12 of the two parts 2, 3. For this purpose, the control element S is for example arranged between the two solid bearings 15a of the two parts 2, 3 and rigidly connected thereto.

FIG. 2c shows an arrangement of the movement direction 16a, 16b of the control element S perpendicular to the direction 21 of the oscillatory movement 12 of the two parts 2, 3. For this purpose, the control element S is for example arranged between the solid bearing 15a and the floating bearing 15b of the lower part 3 and rigidly connected thereto.

FIG. 2b shows an arrangement of the movement direction 16a, 16b of the control element S at an angle to the direction of the oscillatory movement 12 of the two parts 2, 3. For this purpose, a further solid bearing 15a is arranged on the lower part 3 between the solid bearing 15a and the floating bearing 15b of the lower part 3. The control element S is now for example arranged between the further solid bearing 15a and the solid bearing 15a of the upper part 2 and rigidly connected thereto. In this case, the position of the further solid bearing 15a on the lower part 3 determines the angle α taken on by the movement direction 16 of the control element S with respect to the direction 21 of the oscillatory movements 12.

Accordingly, the effect of the force 6 from the control element S can be controlled. The conversion of the force 6 of the control element S into a force Fx, Fy acting between the two parts 2, 3 can thus be predetermined by way of the positioning of the control element S and the connection points thereof. This force 6 is for example always defined as parallel to the movement direction 16a, 16b. In this context, the force Fx acts in a vertical direction and the force Fy acts in a horizontal direction. The magnitudes of Fx and Fy are calculated from the component of the force 6 parallel to the vectors of the forces Fx and Fy.

In FIG. 2a, the vector and magnitude of the force 6 correspond to the vector and magnitude of the force Fy. In FIG. 2b, the magnitude of the force Fy corresponds to the product of the cosine of a and the magnitude of the force 6. In turn, FIG. 2c shows an arrangement in which the vector and magnitude of the force Fx correspond to the vector and magnitude of the force 6. By contrast with FIG. 2a, 2b, in which the hydraulic medium 13 is arranged on the side of the piston 18 facing away from the piston rod 20, the arrangement of FIG. 2c operates when the hydraulic medium 13 is arranged on the side of the piston 18 facing the piston rod 20.

All features disclosed in the application documents are claimed as essential to the invention if they are novel in respect of the prior art individually or in combination.

LIST OF REFERENCE NUMERALS 1 suspension system
2, 3 part
2a, 2b, 3a, 3b ends
4 hydropneumatic circuit
5 vehicle seat
5a longitudinal direction
5b transverse direction
5c vertical direction
6 force
7 action surface
8 volume flow regulation component
9 pump
9a on-state
9b off-state
10 level regulation device
11 flow direction
12 oscillatory movement
13 hydraulic medium
14 gaseous medium
15a solid bearing
15b floating bearing
16a, b movement direction
17 volume flow
18 piston
19a, b scissor arms
20 piston rod
21 oscillation direction
α angle
C1 passive suspension
C2 semi-active suspension
C3 fully-active suspension
C4 seat height adjustment
D1, D2 throttle valve
F1, F2 hydropneumatic spring
Fx, Fy force
p1, p2 pressure
M motor
R non-return valve
S control element
V1, V2a, V2b, V3a, V3b volumes

What is claimed is:

1. A suspension system for a vehicle seat, comprising:
at least a first and a second part, the two parts being mounted to one another via at least one arm such that the two parts are oscillatorily movable and spring-loaded with respect to one another;
a closed hydropneumatic circuit comprising:
a hydraulic medium circulating in a flow direction in the closed hydropneumatic circuit;
at least one control element that is connected to at least one of the two parts, the at least one control element having the hydraulic medium in a first hydraulic volume and having an action surface that is configured to move in at least one direction, which causes the two parts to move with respect to one another, wherein the first hydraulic volume of the at least one control element and the action surface are operably connected; and at least one first hydropneumatic spring having a gaseous medium in a gas volume at a gas pressure and having the hydraulic medium in a second hydraulic volume at a hydraulic pressure; and wherein a change in the gas pressure of the at least one first hydropneumatic spring causes a change in the hydraulic pressure of the hydraulic medium, which changes a force acting on the action surface of the at least one control element.

2. The suspension system according to claim 1, wherein the action surface arranged in the at least one control element is arranged facing the hydraulic medium and is movable in two opposing movement directions by means of oscillatory movements of the two parts with respect to one another, wherein a movement of the action surface in the direction towards the hydraulic medium increases the hydraulic pressure.

3. The suspension system according to claim 1, wherein the movement direction of the at least one control element is arranged parallel, perpendicular and/or at an angle to a direction of the oscillatory movements of the two parts.

4. The suspension system according to claim 1, wherein the closed hydropneumatic circuit further comprises:

an adjustable volume flow regulation component, arranged downstream from the at least one control element and upstream from the at least one first hydropneumatic spring in the flow direction of said closed hydropneumatic circuit, for regulating a volume flow of the hydraulic medium of the closed hydropneumatic circuit, and/or a hydraulic pump arranged downstream from the at least one first hydropneumatic spring and upstream from the at least one control element in the flow direction.

5. The suspension system according to claim 4, wherein the volume flow regulation component is adjustable dependent on acceleration and/or speed values calculable from a sensor and based on the oscillatory movements of the two parts with respect to one another.

6. The suspension system according to claim 1, wherein the hydraulic pressure is changeable by way of a level regulation device arranged in the hydropneumatic circuit, the level regulation device comprising a first throttle valve, arranged between the at least one control element and a hydraulic pump, and a second hydropneumatic spring connected in series therewith, a non-return valve connected in series and a second throttle valve connected in parallel with the non-return valve being arranged between the first throttle valve and the second hydropneumatic spring.

7. The suspension system according to claim 4, wherein the volume flow regulation component is formed by at least one of a servo-hydraulic valve, a proportional valve, an electrorheological valve, and a magnetorheological valve.

8. The suspension system according to claim 1, wherein the at least one control element is formed by at least one of a single-action or dual-action hydraulic cylinder, a membrane actuator, and a bellows actuator.

9. The suspension system according to claim 1, wherein the gaseous medium of the at least one first hydropneumatic spring is nitrogen and the hydraulic medium of the closed hydropneumatic circuit is oil.

10. The suspension system according to claim 6, wherein the gaseous medium of the first spring and a gaseous medium of the second spring are nitrogen.

11. A method for moving parts of a hydropneumatic suspension for a vehicle seat comprising:

circulating a hydraulic medium in a flow direction in a closed hydropneumatic circuit having at least one first hydropneumatics spring, at least one control element, and an adjustable volume flow regulation component arranged downstream from the at least one control element and upstream from the at least one first hydropneumatics spring in the flow direction;

providing a gaseous medium in a gas volume at a gas pressure in the at least one first hydropneumatics spring and providing the hydraulic medium in a hydraulic volume at a hydraulic pressure;

providing an action surface in the at least one control element that is connected to a first part and a second part, which are connected via at least one arm such that the two parts are oscillatorily movable and spring-loaded with respect to one another;

changing the gas pressure of the gaseous medium in the at least one first hydropneumatics spring, which changes the hydraulic pressure of the hydraulic medium;

regulating, by the adjustable volume flow regulation component, a volume flow of the hydraulic medium;

changing, by the change of the hydraulic pressure of the hydraulic medium, a force generated on the action surface of the at least one control element to move the action surface in at least one direction and to move the two parts with respect to each other.

12. The method according to claim 11, wherein the volume flow of the hydraulic medium of the closed hydropneumatic circuit is driven by means of a hydraulic pump, arranged downstream from the at least one first hydropneumatics spring and upstream from the at least one control element in the flow direction of the closed hydropneumatic circuit, in an on state of the hydraulic pump.

13. The method according to claim 11, wherein the volume flow of the hydraulic medium is kept constant by means of the volume flow regulation component in an off state of a hydraulic pump, and passive suspension is thus provided.

14. The method according to claim 11, wherein the volume flow of the hydraulic medium is adjusted by means of the volume flow regulation component dependent on acceleration and/or speed values, calculable from a sensor and based on the oscillatory movements of the two parts with respect to one another, in an off state of a hydraulic pump, and semi-active suspension is thus provided.

15. The method according to claim 11, wherein the volume flow of the hydraulic medium is adjusted by means of the volume flow regulation component dependent on acceleration and/or speed values, calculable from a sensor and based on the oscillatory movements of the two parts with respect to one another, in an on state of a hydraulic pump, and fully-active suspension is thus provided.

16. The method according to claim 12, wherein the volume flow of the hydraulic medium is adjusted to a minimum value by means of the volume flow regulation component in the on state of the pump, and seat height adjustment is thus provided.

* * * * *